(12) United States Patent
Pedersen et al.

(10) Patent No.: US 6,378,178 B1
(45) Date of Patent: Apr. 30, 2002

(54) SEAT BELT DESIGN AND BUCKLE

(76) Inventors: Mark W Pedersen, 500 University Place; Jae Jun Park, 111 Newbury Hollow La. Apt. #11, both of Syracuse, NY (US) 13210

( * ) Notice: Subject to any disclaimer, the term of this patent is extended or adjusted under 35 U.S.C. 154(b) by 0 days.

(21) Appl. No.: 09/543,877

(22) Filed: Apr. 6, 2000

Related U.S. Application Data

(60) Provisional application No. 60/129,210, filed on Apr. 14, 1999.

(51) Int. Cl.[7] .............................................. A44B 11/25
(52) U.S. Cl. .............................. 24/635; 24/634; 24/648
(58) Field of Search ................................ 297/468, 483; 24/298, 300, 301, 302, 165, 265 A, 265 BC, 265 CD, 265 H, 265 EC, 131, 198, 199, 200, 264, 643, 648, 647, 634, 635, 637, 68 SB

(56) References Cited

U.S. PATENT DOCUMENTS

| | | | | |
|---|---|---|---|---|
| 2,902,737 A | * | 9/1959 | Moran | 24/645 |
| 3,608,962 A | * | 9/1971 | Knecht | 297/482 |
| 3,623,194 A | * | 11/1971 | Claeson et al. | 24/635 |
| 3,981,519 A | * | 9/1976 | Cataldo | 280/744 |
| 4,334,341 A | * | 6/1982 | Krautz et al. | 24/635 |
| 4,351,526 A | * | 9/1982 | Schwartz | 482/108 |
| 4,709,454 A | * | 12/1987 | Barnes | 24/590 |
| 5,135,455 A | * | 8/1992 | King et al. | 482/108 |
| 5,535,485 A | * | 7/1996 | Kirchner | 24/170 |
| 6,138,331 A | * | 10/2000 | Powers | 24/633 |

\* cited by examiner

*Primary Examiner*—Anthony Knight
*Assistant Examiner*—Ruth C. Rodriguez
(74) *Attorney, Agent, or Firm*—Wall Marjama & Bilinski

(57) ABSTRACT

A locking buckle for a seat belt which includes a latch assembly having a funnel shaped receiving portion which includes a plurality of spring actuated locking members at the bottom of the receiving portion which is adapted to be moved between an open and locked position in response to pressure from a locking member. The locking member has a conically shaped head portion and a retention shoulder at the back of the conical head, with the head portion being adapted to engage the locking members in a locked position and where the locking members contact the retention shoulder in locked engagement. In one embodiment, the locking member further includes an outer retention strap for holding the user's hand in permanent contact with the locking member.

1 Claim, 4 Drawing Sheets

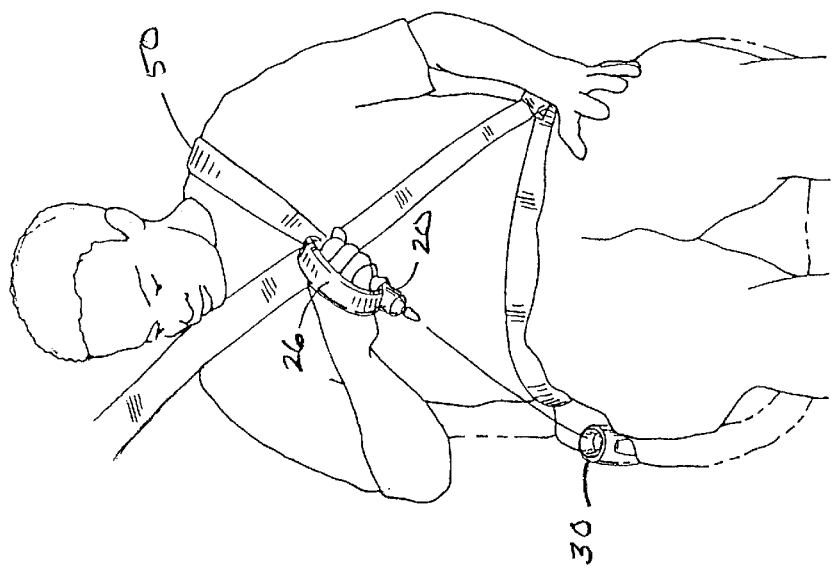
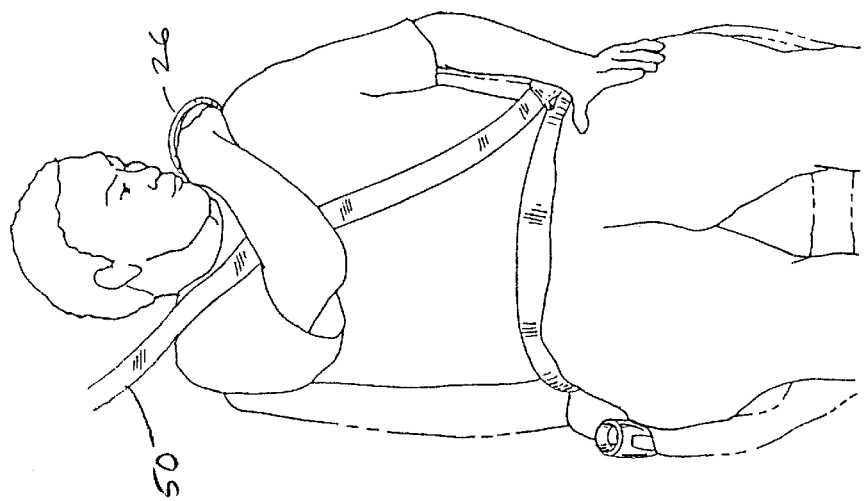
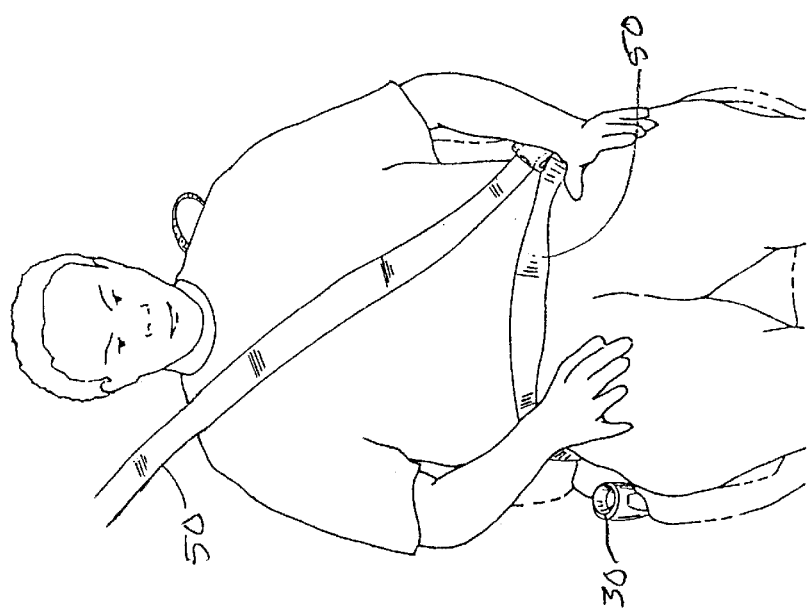

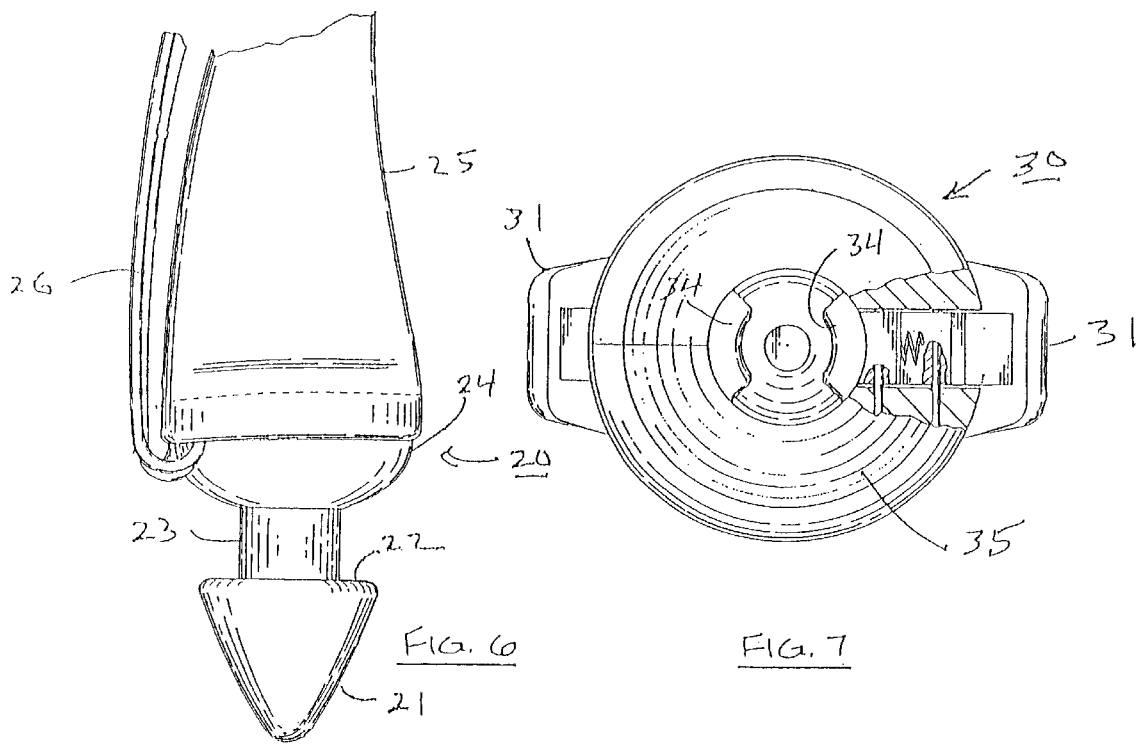
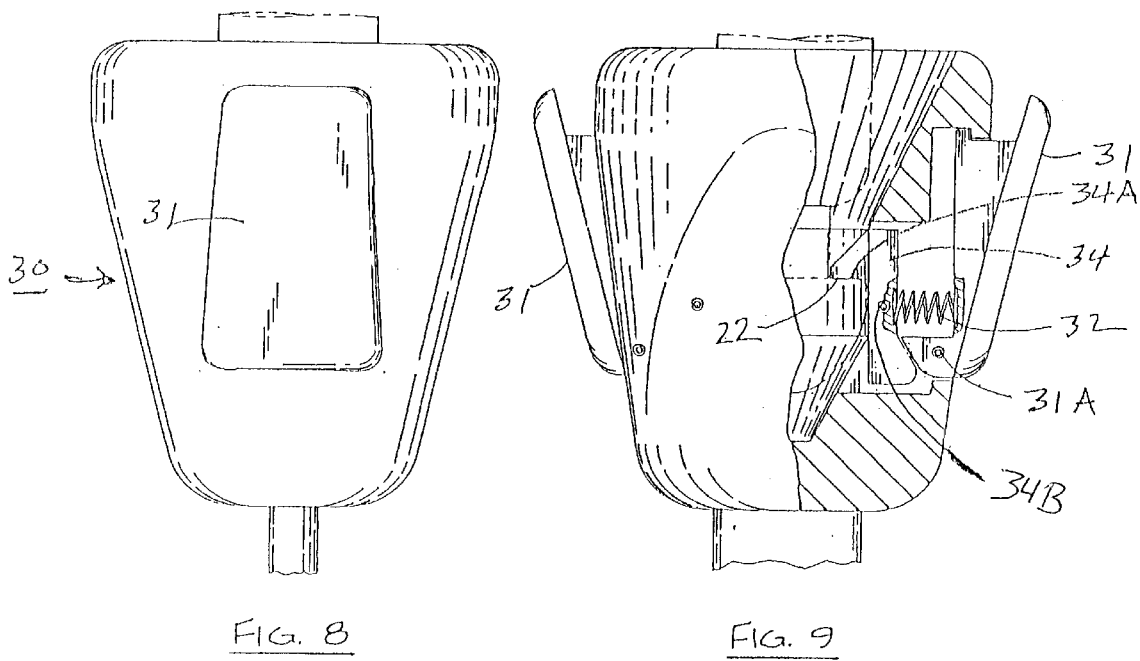

SEAT BELT DESIGN AND BUCKLE

CROSS REFERENCE TO RELATED APPLICATION

Reference is made to and priority claimed from U.S. Provisional Application Serial No. 60/129,210 filed Apr. 14, 1999, entitled SEAT BELT DESIGN AND BUCKLE.

BACKGROUND OF THE INVENTION

The present invention relates to seat belts, and more specifically, to an improved belt assembly and buckle.

The prior art is replete with the seat belt designs and buckles which are used in vehicles and aircraft. These devices, while accomplishing their intended purpose, suffer from certain disadvantages with respect to challenges presented to the disabled and elderly who have problems in connecting and disconnecting the buckle open and closure means. A common problem associated with these prior art seat belt designs and buckles is that closure means or latch is commonly a straight rectangular piece of metal which must be inserted into a receiving slot. These devices require precise alignment to lock effectively, and can cause frustration and concern among a large percentage of users of these devices.

U.S. Pat. Nos. 1,548,023; 2,852,270; and 3,623,194 are exemplary of the state of the art with respect to these devices. There is, therefore, a need for seat belt design having an open and closure buckle which allows for ease of opening and closing without resorting to mistrials and errors which are common with the current buckle designs.

The present invention is directed to a novel buckle design, which is easy to use for all occupants, and overcomes the current limitations which are problems for the elderly, arthritic, and those with sight problems and other disabilities. The design of the present invention provides a fail safe means for locking the buckle which can easily be accomplished for a person with severe disabilities or eyesight problems and even for people who are blind.

SUMMARY OF THE INVENTION

It is, therefore, an object of the present invention to present a convenient seat belt design which is user friendly.

It is another object of the present invention to provide novel seat belt design which insures ease of buckling and unbuckling.

It is yet another object of the present invention to provide a seat belt assembly which enhances passenger safety and usability.

It is a further object of the present invention to provide a buckle for a seat belt which improves ease of use for the disabled and elderly.

The present invention is directed to a locking buckle for a seat belt and a seat belt assembly. The buckle comprises a latch assembly which includes a funnel shaped receiving section having a spring actuated locking means. The buckle further includes an elongated locking member having a conical head portion which has a retention shoulder at the back of the head, with the head portion being adapted to engage the locking member in a locked position at the retention shoulder. The locking member further includes an outer retention strap for holding the user's hand in permanent contact with the locking member to insure accurate and easy engagement of the conical head portion with the funnel shaped receiving section to lock the buckle. The strap also enables persons with disabilities to insert their hand into the retention strap and engage the mechanism without the need to grip the locking member.

BRIEF DESCRIPTION OF THE DRAWING

For a fuller understanding of the nature and objects of the invention, reference should be made to the following detailed description of a preferred mode of practicing the invention, read in connection with the accompanying drawings, in which:

FIGS. 1–3 illustrate perspective views of the use of the seat belt and buckle system of the present invention.

FIG. 6 is a view of the locking member of the present invention.

FIG. 7 is a top partial sectional view of the latch assembly of the present invention.

FIG. 8 is a view of the latch assembly.

FIG. 9 is a partial sectional side view of the latch assembly of FIG. 8.

DETAILED DESCRIPTION OF THE INVENTION

FIGS. 1, 2 and 3 depict a perspective view of the seat belt assembly and buckle of the present invention in which straps 50 are locked in place using latch assembly 30 and locking member 20. The second seat belt (criss-cross pattern illustrated in FIG. 3 is housed within the seat for illustration purposes only) shows the strap above the seat level. The retractor is located within the seat back (not shown).

Figure 5:
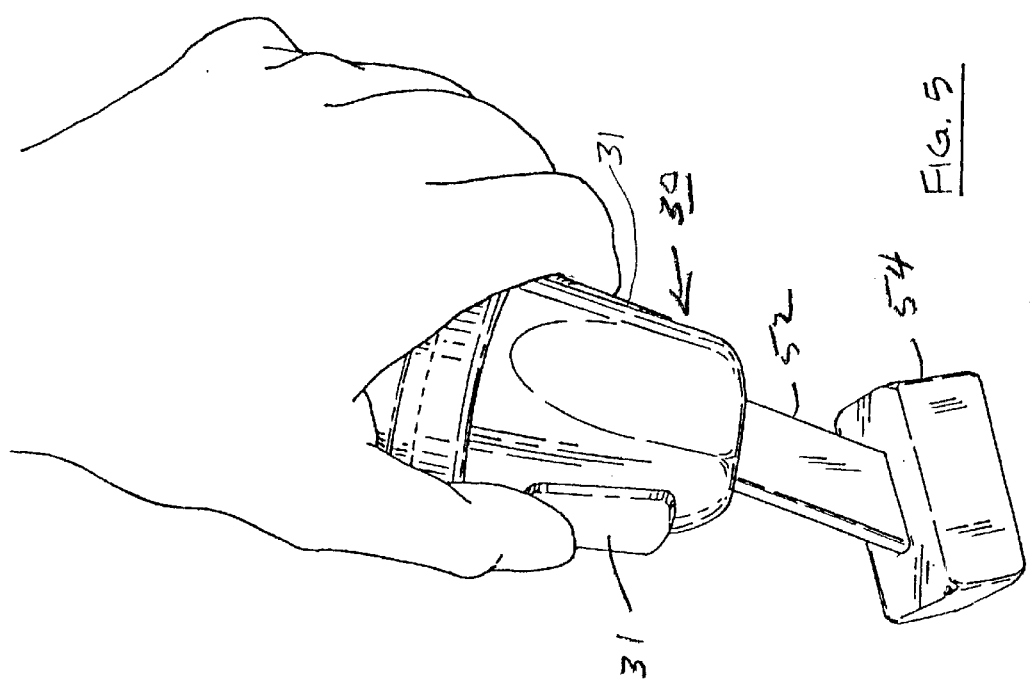
FIGS. 4 and 5 illustrate in perspective, the locking and unlocking of the device of the present invention.
Figure 4:
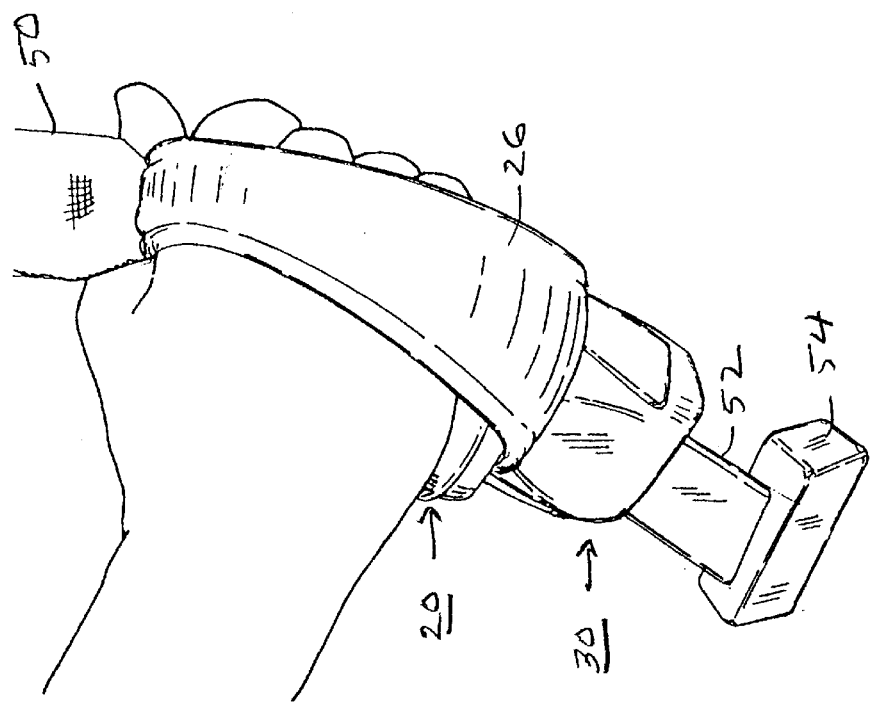
Figure 10:
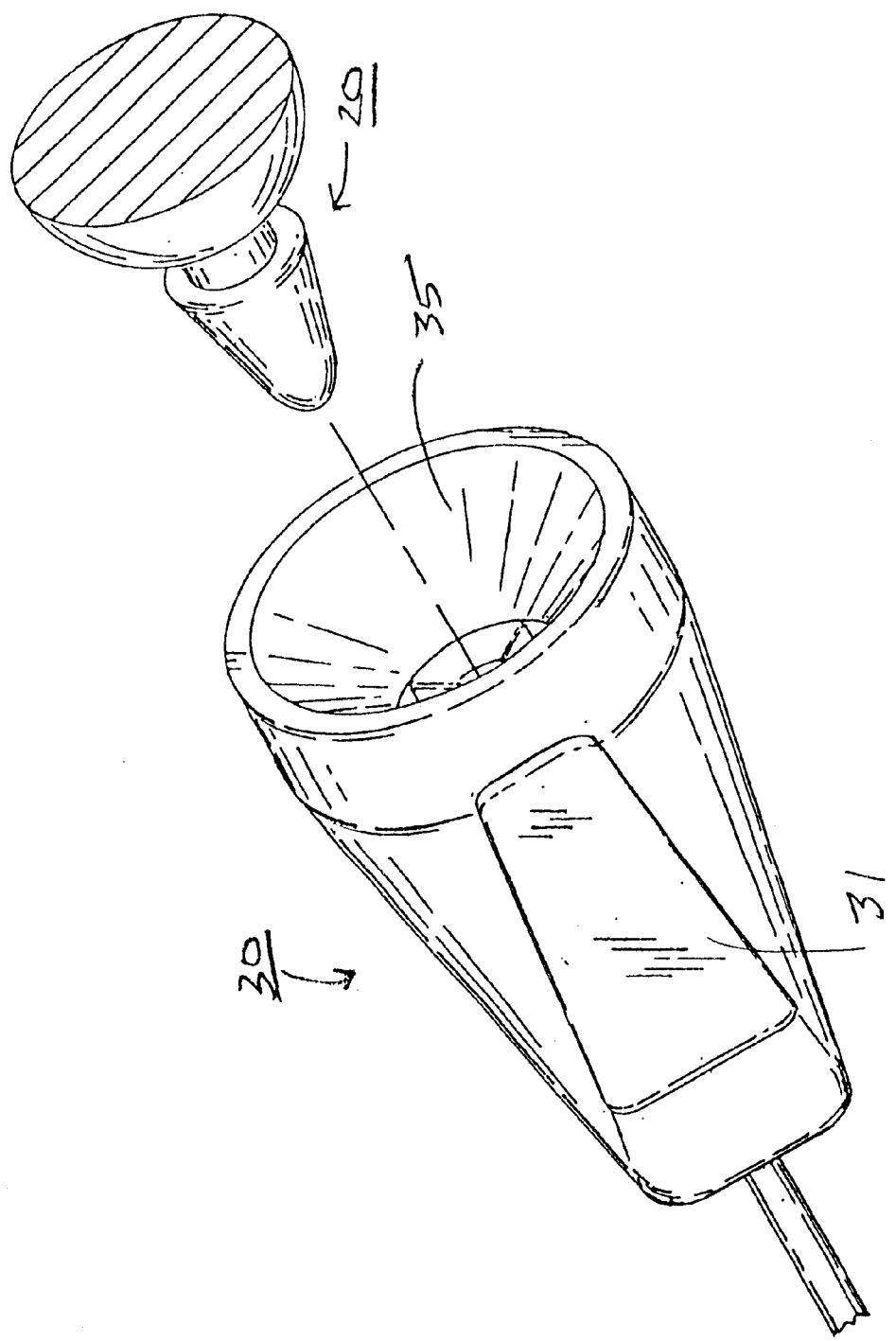
FIG. 10 is a perspective view of the buckle of the present invention.

FIGS. 4 and 5 represent an enlarged view in which the locking and unlocking of the device are illustrated. In FIG. 4, locking member 20 has been inserted in latch assembly 30 which is held in place by strap 52 which is fixed into support 54. In FIG. 5 release buttons 31 can be pressed to release and unlock locking member 20. The device is illustrated more specifically in FIGS. 6–9 in which, in FIG. 6. the locking member comprises a conical head 21 having a retention shoulder 22 connected to a support shaft 23 and a base member 24 and body 25. Outer retention strap 26 is affixed to body portion 25 in order to insure easy engagement of the conical head portion with the funnel shaped receiving section 35 of latch assembly 30. Latch assembly 30 is shown in greater detail in FIGS. 7 and 9 and comprises a pair of release buttons 31 which are connected to spring members 32 which is connected to a pin 34B, and locking jaw 34, which has a contact surface 34A which abuts against retention shoulder 22 of conical head 21. The funnel shaped region 35 of the latch assembly allows for easy access of conical head to engage the locking jaws.

In operation, conical head 21 of locking mechanism 20 is pushed down into the funnel region 35 where it encounters the locking jaw and where pressure from the conical head overcomes the release spring 32 allows the retention shoulder of the conical head to become locked in place by surface 34A of locking jaw 34. Two buttons 31 which rotate about pin 31A are employed as a fail safe measure against accidental release of the buckle as buttons 31 are is depressed. The locking jaw rotates around pivot pin 34B releasing or removing contact on retention shoulder 22 of the conical head allowing the conical head to be removed from funnel region 35.

As can be seen from the above, the present invention provides a novel buckle design which provides for ease of use in locking and unlocking for persons with severe disabilities.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A locking buckle for a seat belt which comprises:
   (a) a latch assembly which includes a funnel shaped receiving portion which includes a bottom section having a plurality of spring actuated locking members at said bottom section of said receiving portion, said locking members being adapted to be moved between an open and locked position in response to pressure from a locking member; and
   (b) a locking member having a conical head portion which includes a retention shoulder at the back of said conical head, with said conical head being adapted to engage said locking members in a locked position whereby said locking members contact said retention shoulder in locked engagement, with said locking member further including an outer retention strap which functions to hold a user's hand in permanent contact with the locking member.

\* \* \* \* \*